(12) United States Patent
Tsai

(10) Patent No.: US 12,013,626 B2
(45) Date of Patent: Jun. 18, 2024

(54) ROTATION WHEEL AND PROJECTION APPARATUS

(71) Applicant: Coretronic Corporation, Hsin-Chu (TW)

(72) Inventor: Te-Ying Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/892,126

(22) Filed: Aug. 22, 2022

(65) Prior Publication Data

US 2023/0077284 A1 Mar. 9, 2023

(30) Foreign Application Priority Data

Sep. 6, 2021 (CN) .......................... 202122155753.8

(51) Int. Cl.
*G03B 21/20* (2006.01)
*G02B 26/00* (2006.01)

(52) U.S. Cl.
CPC ........... *G03B 21/20* (2013.01); *G02B 26/008* (2013.01)

(58) Field of Classification Search
None
See application file for complete search history.

(56) References Cited

U.S. PATENT DOCUMENTS

| 2006/0066817 A1* | 3/2006 | Chin | ................... G03B 21/145 353/84 |
| 2008/0049345 A1* | 2/2008 | Niwa | ................... G02B 26/008 359/889 |

FOREIGN PATENT DOCUMENTS

| CN | 105511213 A | * | 4/2016 |
| CN | 110989279 A | * | 4/2020 |
| TW | 201642011 | | 12/2016 |

* cited by examiner

*Primary Examiner* — Bao-Luan Q Le
*Assistant Examiner* — Danell L Owens
(74) *Attorney, Agent, or Firm* — JCIPRNET

(57) ABSTRACT

A rotation wheel including a turntable and a motor is provided. The turntable is connected to the motor. The turntable has a first surface used for receiving an incident beam and a second surface opposite to the first surface. The first surface includes a light adjusting surface and a connecting surface. The connecting surface is used to connect the light adjusting surface and the motor. The light adjusting surface is perpendicular to a rotating axis of the motor. At least a part of the connecting surface is neither parallel nor perpendicular to the rotating axis.

14 Claims, 10 Drawing Sheets

ROTATION WHEEL AND PROJECTION APPARATUS

CROSS-REFERENCE TO RELATED APPLICATION

This application claims the priority benefit of China application serial no. 202122155753.8, filed on Sep. 6, 2021. The entirety of the above-mentioned patent application is hereby incorporated by reference herein and made a part of this specification.

BACKGROUND

Technical Field

The invention relates to a rotation wheel and a projection apparatus using the same.

Description of Related Art

Currently, in a projector with a phosphor wheel structure, when an excitation light source is a laser, laser light is used to excite a phosphor layer on the phosphor wheel to generate red light and green light, respectively. Since the phosphor wheel needs to be irradiated by the excitation light source, there are certain requirements for heat dissipation of the phosphor wheel.

Generally, fan blades and holes are added to the phosphor wheel to enhance heat convection, but this increases noise as well. With a dual-layer phosphor wheel design, heat may be conducted from a first layer structure to a second layer structure. Such design may increase a heat dissipation area but increase noise.

As energy density of the laser light continues to increase, at present the design of the phosphor wheel no longer meets the heat dissipation requirements of the phosphor wheel.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a rotation wheel, which has a favorable heat dissipation effect.

The invention provides a projection apparatus using the rotation wheel, and in addition to the favorable heat dissipation effect of the projection apparatus, the rotation wheel further has good energy conversion efficiency.

An embodiment of the invention provides a rotation wheel including a turnable disc and a motor. The turnable disc is connected to the motor. The turnable disc has a first surface and a second surface opposite to the first surface. The first surface includes a light adjusting surface and a connecting surface. The connecting surface is used to connect the light adjusting surface and the motor. The light adjusting surface is perpendicular to a rotating axis. At least a part of the connecting surface is neither parallel nor perpendicular to the rotating axis.

In an embodiment of the invention, the turnable disc is of equal thickness.

In an embodiment of the invention, the turntable is of equal thickness.

In an embodiment of the invention, the connecting surface is a curved surface.

In an embodiment of the invention, the connecting surface is an inclined surface.

In an embodiment of the invention, the connecting surface includes a plurality of sub-connecting surfaces, and each sub-connecting surface and an adjacent sub-connecting surface thereof are perpendicular to each other.

In an embodiment of the invention, the light adjusting surface includes a plurality of sub-light adjusting surfaces, and the connecting surface includes a plurality of sub-connecting surfaces, where the plurality of sub-light adjusting surfaces and the plurality of sub-connecting surfaces are disposed in a staggered manner and take the motor as a circle center.

In an embodiment of the invention, the rotation wheel further includes fan blades disposed on the motor.

In an embodiment of the invention, the rotation wheel further includes a fixing element and a blade structure, the fixing element is used to fix the turnable disc on the motor, and the blade structure is disposed on the fixing element or the connecting surface.

In an embodiment of the invention, the rotation wheel further includes a fixing element and a punch structure, the fixing element is used to fix the turnable disc on the motor, and the punch structure is disposed on the connecting surface.

An embodiment of the invention provides a projection apparatus including an illumination system, a light valve and a projection lens. The illumination system is used to provide an illumination beam. The light valve is disposed on a transmission path of the illumination beam, and is used to convert the illumination beam into an image beam. The projection lens is disposed on a transmission path of the image beam, and used to project the image beam out of the projection apparatus. The illumination system includes a light source and a rotation wheel. The light source is used to emit an incident beam. The incident beam is converted into the illumination beam by the rotation wheel. The rotation wheel includes a turnable disc and a motor. The turnable disc is connected to the motor. The turnable disc has a first surface and a second surface opposite to the first surface. The first surface includes a light adjusting surface and a connecting surface. The connecting surface is used to connect the light adjusting surface and the motor. The light adjusting surface is perpendicular to a rotating axis. At least a part of the connecting surface is neither parallel nor perpendicular to the rotating axis.

Based on the above description, in the rotation wheel and the projection apparatus using the rotation wheel of an embodiment of the invention, since at least a part of the connecting surface of the rotation wheel is neither parallel nor perpendicular to the rotating axis of the motor, a heat dissipation area of the rotation wheel is increased to increase the energy conversion efficiency of the rotation wheel.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back" etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
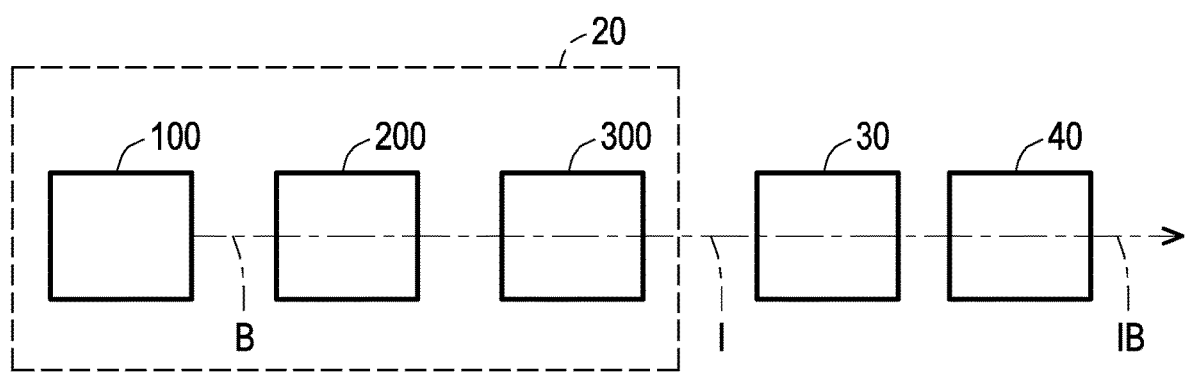
FIG. 1A is a schematic diagram of a projection apparatus according to a first embodiment of the invention.

FIG. 1A is a schematic diagram of a projection apparatus according to a first embodiment of the invention. Referring to FIG. 1A, an embodiment of the invention provides a projection apparatus (such as a projector) 10, which includes an illumination system 20, a light valve 30 and a projection lens 40. The illumination system 20 is used to provide an illuminating light beam I. The light valve 30 is disposed on a transmission path of the illumination beam I, and is used to convert the illumination beam I into an image beam IB. The projection lens 40 is disposed on a transmission path of the image beam IB, and is used to project the image beam IB out of the projection apparatus 10. The illumination system 20 includes a light source 100, a rotation wheel 200 and a light uniformizing element 300. The light source 100 is used to emit an incident beam B. The incident beam B is converted into the illumination beam I by the rotation wheel 200 and transmitted to the uniformizing element 300.

In detail, the light valve 30 of the embodiment is, for example, a spatial light modulator such as a digital micromirror device (DMD), a liquid-crystal-on-silicon panel (LCOS panel), or a liquid crystal panel, etc. In addition, the projection lens 40 includes, for example, a combination of one or a plurality of optical lenses having refracting powers. The optical lens, for example, includes various combinations of non-planar lenses such as a biconcave lens, a biconvex lens, a concavo-convex lens, a convexo-concave lens, a plano-convex lens, a plano-concave lens, etc. The invention does not limit the pattern and type of the projection lens 40.

In the embodiment, the light source 100 is, for example, a laser diode (LD), a light-emitting diode (LED), or other suitable light sources or a combination thereof, which is not limited by the invention. In addition, the incident beam B may be ultraviolet light, blue light, or light beams of other colors or a combination thereof. The uniformizing element 300 is, for example, an integration rod, a lens array, for example, a fly-eye lens array or other optical elements with a light uniformizing effect, but the invention is not limited thereto.

Figure 1B:
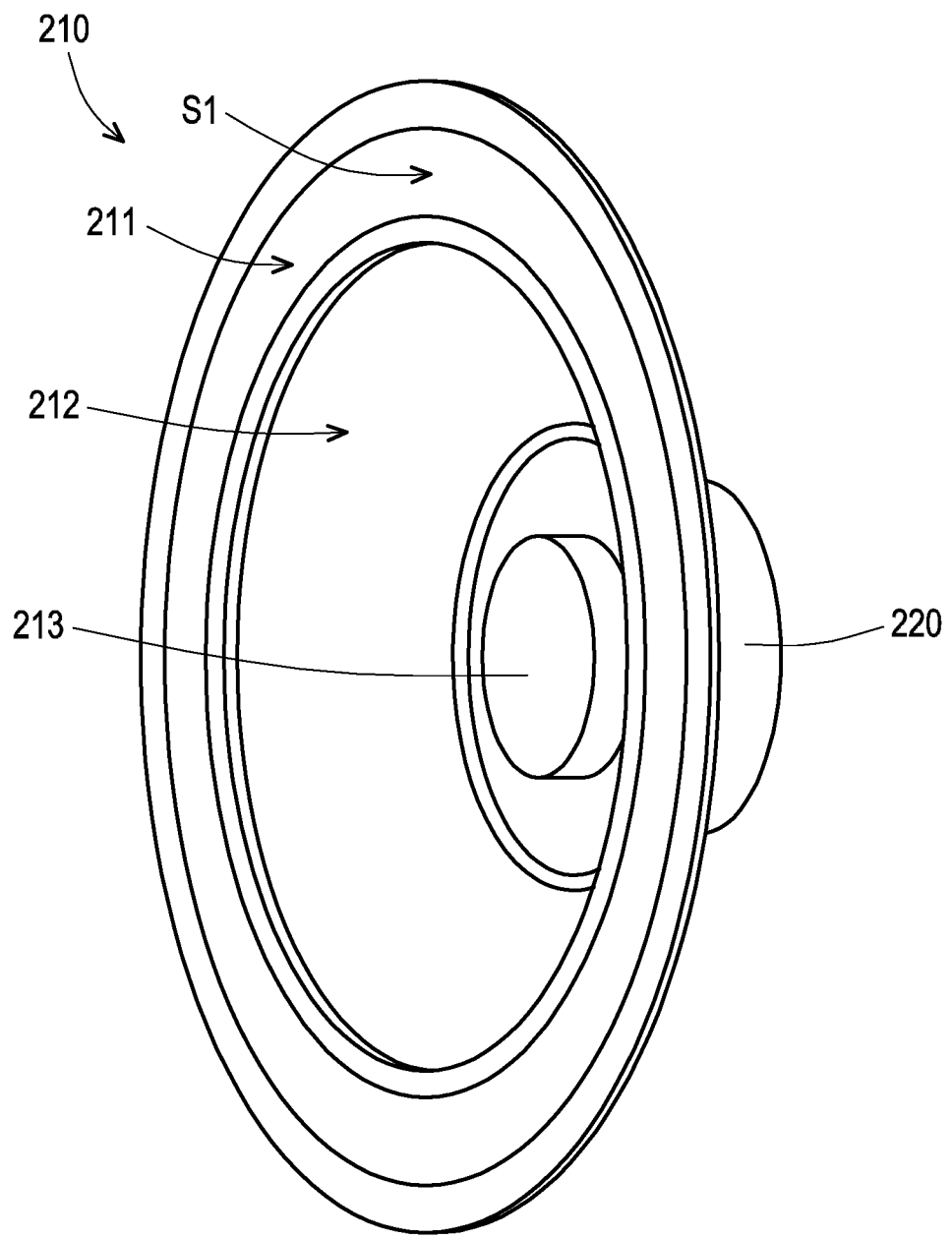
FIG. 1B is a schematic three-dimensional view of a rotation wheel in FIG. 1A.
Figure 1C:
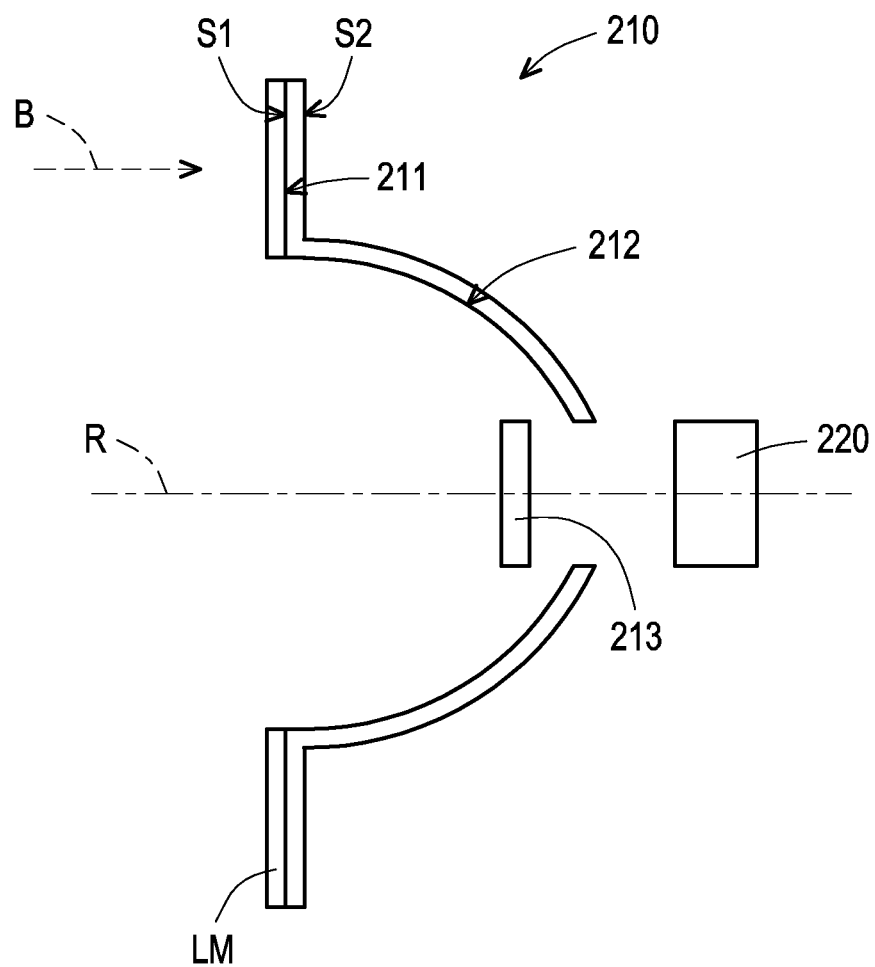
FIG. 1C is a schematic cross-sectional view of FIG. 1B.

FIG. 1B is a schematic three-dimensional view of the rotation wheel in FIG. 1A. FIG. 1C is a schematic cross-sectional view of FIG. 1B. Referring to FIG. 1B and FIG. 1C, in the embodiment, the rotation wheel 200 includes a turnable disc 210 and a motor 220. The turnable disc 210 is connected to the motor 220. The turnable disc 210 has a first surface S1 and a second surface S2 opposite to the first surface S1. The first surface S1 is closer to the light source 100 than the second surface S2. The first surface S1 includes a light adjusting surface 211 and a connecting surface 212. The connecting surface 212 is used to connect the light adjusting surface 211 and the motor 220. The light adjusting surface 211 of the turnable disc 210 is located on a transmission path of the incident beam B. The incident beam B is irradiated toward the light adjusting surface 211 along a direction parallel to the rotating axis R of the motor 220, and the light adjusting surface 211 is substantially perpendicular to the rotating axis R. At least a part of the connecting surface 212 is neither parallel nor perpendicular to the rotating axis R.

In the embodiment, the turnable disc 210 is substantially of equal thickness. The rotation wheel 200 further includes a light adjusting layer LM. Where, a thickness of the light adjusting layer LM in FIG. 1C is adjusted to conveniently indicate that the light adjusting layer LM is disposed on the light adjusting surface 211, but compared to a thickness of the turnable disc 210, the thickness of the light adjusting layer LM is less than the thickness of the turnable disc 210.

In the embodiment, the light adjusting layer LM may be a wavelength conversion layer including a wavelength conversion material layer, or the light adjusting layer LM may be a filter layer. When the light adjusting layer LM is a wavelength conversion layer, the wavelength conversion material layer of the light adjusting layer LM absorbs the incident beam B and converts it into an excitation light beam having a wavelength different from the incident beam B. For example, the rotation wheel 200 may be a phosphor wheel. When the light adjusting layer LM is a filter layer, the light adjusting layer LM allows light of a specific wavelength to pass through and absorbs or reflects light of other wavelengths. For example, the rotation wheel 200 may be a filter wheel. Where, the turnable disc 210 may be a light-transmitting substrate or a metal substrate.

In the embodiment, the connecting surface 212 is, for example, a cup-shaped surface. In FIG. 1C, the connecting surface 212 is a curved surface, and the connecting surface 212 presents a curve in a cross-section along the rotating axis R. Compared to the connecting surface 212, a surface formed by connecting one end of the connecting surface 212 connected to the motor 220 and one end of the connecting surface 212 away from the motor 220 is closer to the rotating axis R. Namely, on the side of the first surface S1 of the turnable disc 210, the connecting surface 212 is concave. Since the connecting surface 212 is designed as a curved surface, an area of the connecting surface 212 of the turnable disc 210 is greatly increased. Therefore, the heat generated by the incident beam B irradiating the light adjusting layer LM may be greatly dissipated into the environment through the connecting surface 212, so that the rotation wheel has a good heat dissipation effect.

In the embodiment, the rotation wheel 200 further includes a fixing element 213. The fixing element 213 is used to fix the turnable disc 210 on the motor 220, so that the motor 220 may drive the turnable disc 210 to rotate, as shown in FIG. 1B. In order to conveniently illustrate relative positions of the fixing element 213, the turnable disc 210, and the motor 220, the fixing element 213, the turnable disc 210, and the motor 220 are drawn separately in FIG. 1C.

Based on the above description, in an embodiment of the invention, the rotation wheel 200 includes the turnable disc 210 and the motor 220. The first surface S1 of the turnable disc 210 includes the light adjusting surface 211 and the connecting surface 212, and at least a part of the connecting surface 212 is neither parallel nor perpendicular to the rotating axis R of the motor 220. In case that a distance between an outer edge of the turnable disc 210 (for example, a position of the light adjusting surface 211) and the rotating axis R is constant, the outer edge of the turnable disc 210 is extended along the direction of the rotating axis R, i.e., a distance between the outer edge of the turnable disc 210 and the motor 220 is increased in comparison with a conventional flat turnable disc. Therefore, in case that the conversion efficiency of the rotation wheel 200 is the same, compared to a conventional flat turnable disc, the heat dissipation area of the rotation wheel 200 is increased, so that the heat dissipation efficiency is improved and the temperature of the rotation wheel 200 is reduced, thereby the conversion efficiency of the light adjusting layer LM is improved. Further, a diameter of the turnable disc 210 of the invention relative to the rotating axis R may be shorter than that of the conventional flat turnable disc, which further reduces a volume of the projection apparatus 10.

Figure 2:
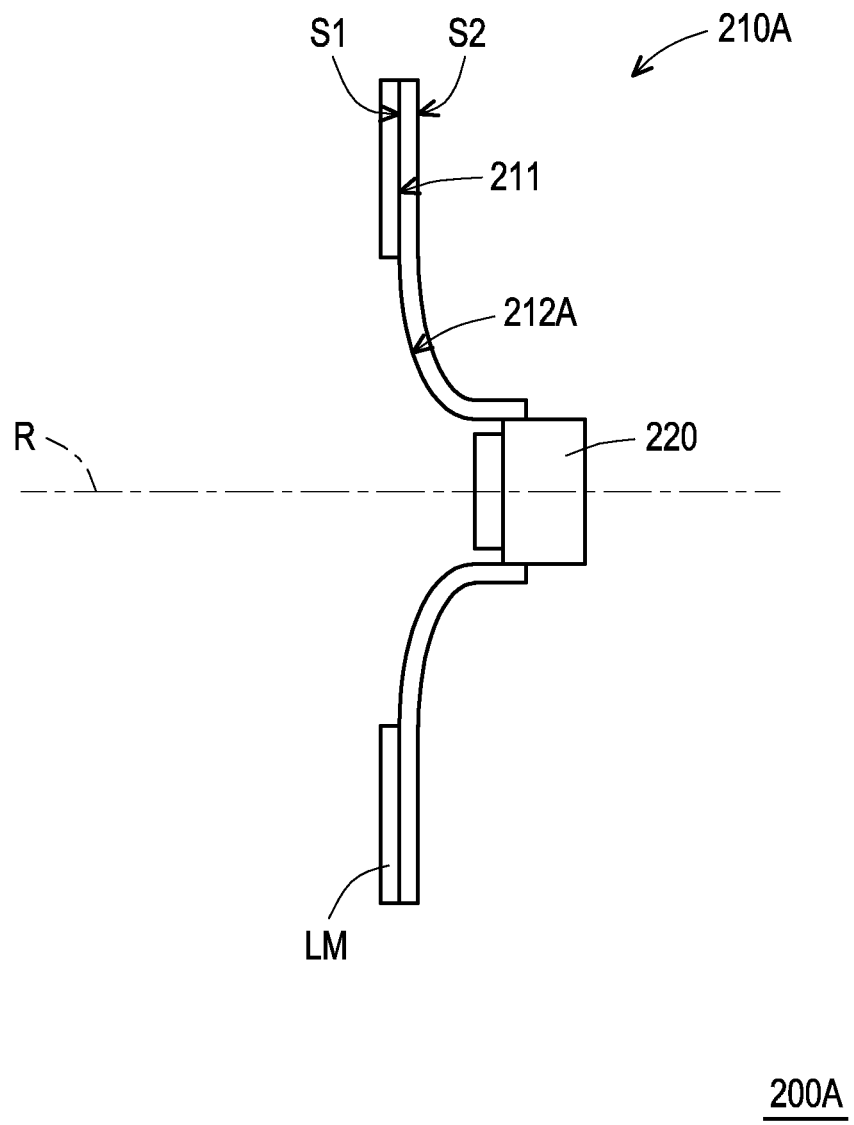
FIG. 2 is a schematic cross-sectional view of a rotation wheel according to a second embodiment of the invention.

FIG. 2 is a schematic cross-sectional view of a rotation wheel according to a second embodiment of the invention. Referring to FIG. 2, a rotation wheel 200A is similar to the rotation wheel 200 of FIG. 1C, and main differences there between are as follows. In the embodiment, a connecting surface 212A of a turnable disc 210A is also a curved surface, and the connecting surface 212A presents a curve in a cross-section along the rotating axis R. However, compared to the connecting surface 212A, a surface formed by connecting one end of the connecting surface 212A connected to the motor 220 and one end of the connecting surface 212A away from the motor 220 is away from to the rotating axis R. Namely, on the side of the first surface S1 of the turnable disc 210A, the connecting surface 212A is convex. The advantages of the rotation wheel 200A of the embodiment are similar to the advantages of the rotation wheel 200 of FIG. 1C, and details thereof are not repeated.

Figure 3:
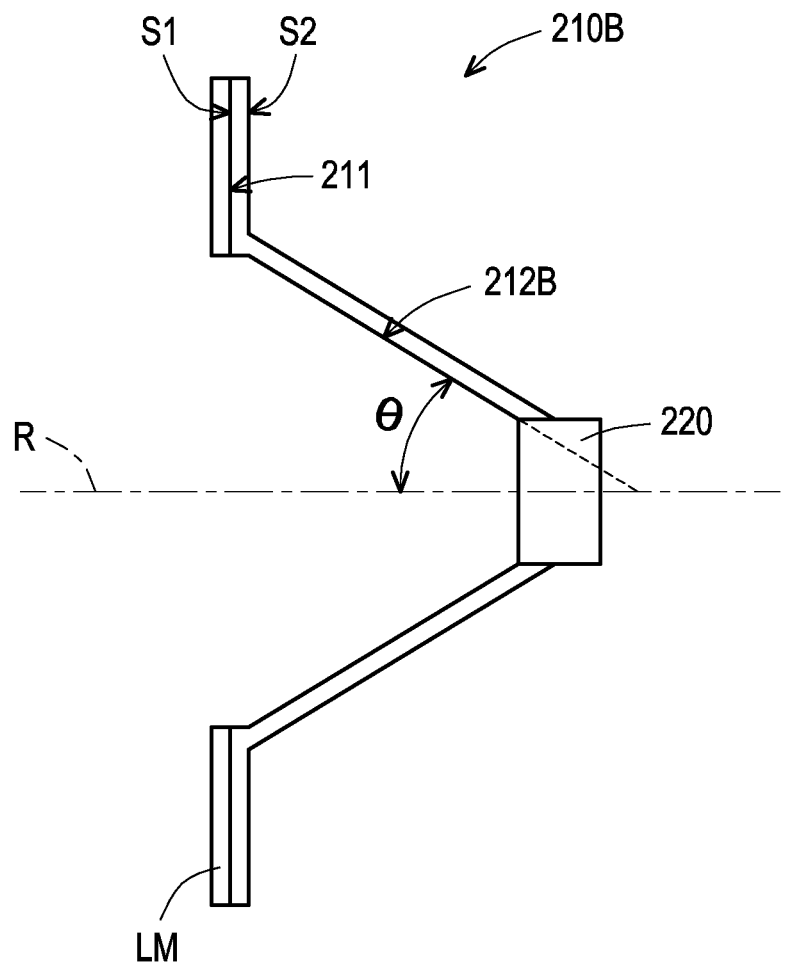
FIG. 3 is a schematic cross-sectional view of a rotation wheel according to a third embodiment of the invention.

FIG. 3 is a schematic cross-sectional view of a rotation wheel according to a third embodiment of the invention. Referring to FIG. 3, a rotation wheel 200B is similar to the rotation wheel 200 of FIG. 1C, and main differences there between are as follows. In the embodiment, a connecting surface 212B of a turnable disc 210B is a plane. The connecting surface 212B is, for example, a pyramid-shaped surface. The connecting surface 212B has an inclined angle θ with respect to the rotating axis R. The connecting surface 212B is an inclined surface with respect to the rotating axis R. The advantages of the rotation wheel 200B of the embodiment are similar to the advantages of the rotation wheel 200 of FIG. 1C, and details thereof are not repeated.

Figure 4:
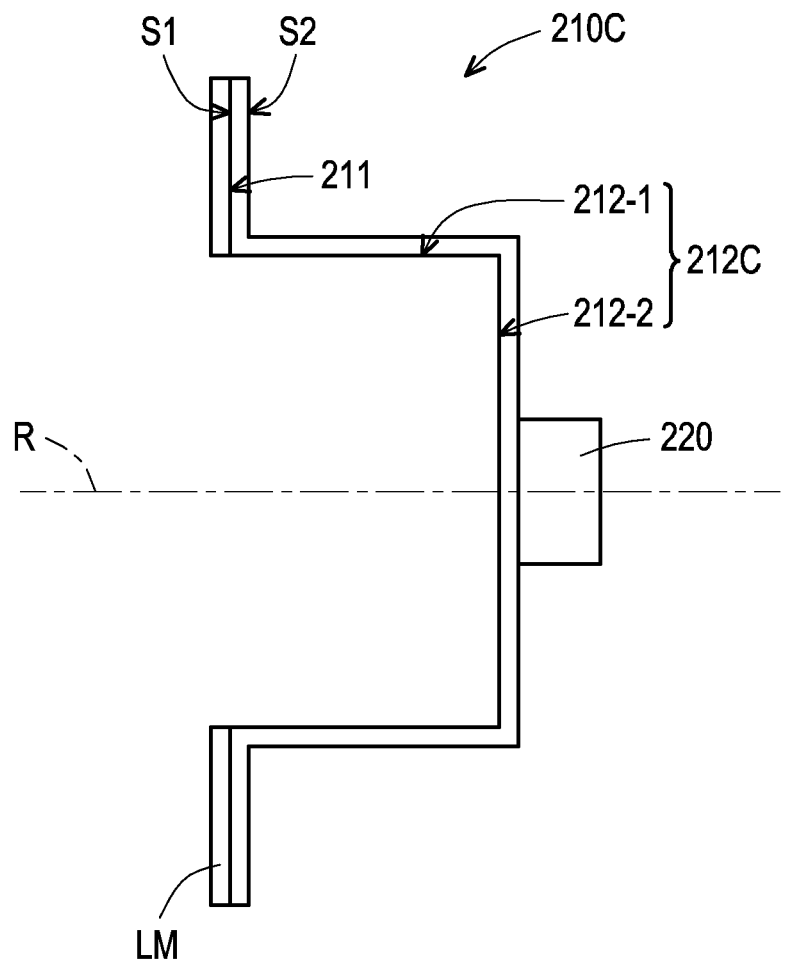
FIG. 4 is a schematic cross-sectional view of a rotation wheel according to a fourth embodiment of the invention.

FIG. 4 is a schematic cross-sectional view of a rotation wheel according to a fourth embodiment of the invention. Referring to FIG. 4, a rotation wheel 200C is similar to the rotation wheel 200 of FIG. 1C, and main differences there between are as follows. In the embodiment, a connecting surface 212C of a turnable disc 210C includes a plurality of sub-connecting surfaces 212-1 and 212-2. Each of the sub-connecting surfaces 212-1, 212-2 and the adjacent sub-connecting surface 212-1 or 212-2 are perpendicular to each other. The sub-connecting surface 212-1 presents a ring-shape, and the sub-connecting surface 212-1 is a circle in each cross-section perpendicular to the rotating axis R and has a same radius. Moreover, the sub-connecting surface 212-2 is a round surface perpendicular to the rotating axis R. The advantages of the rotation wheel 200C of the embodiment are similar to the advantages of the rotation wheel 200 of FIG. 1C, and details thereof are not repeated.

Figure 5:
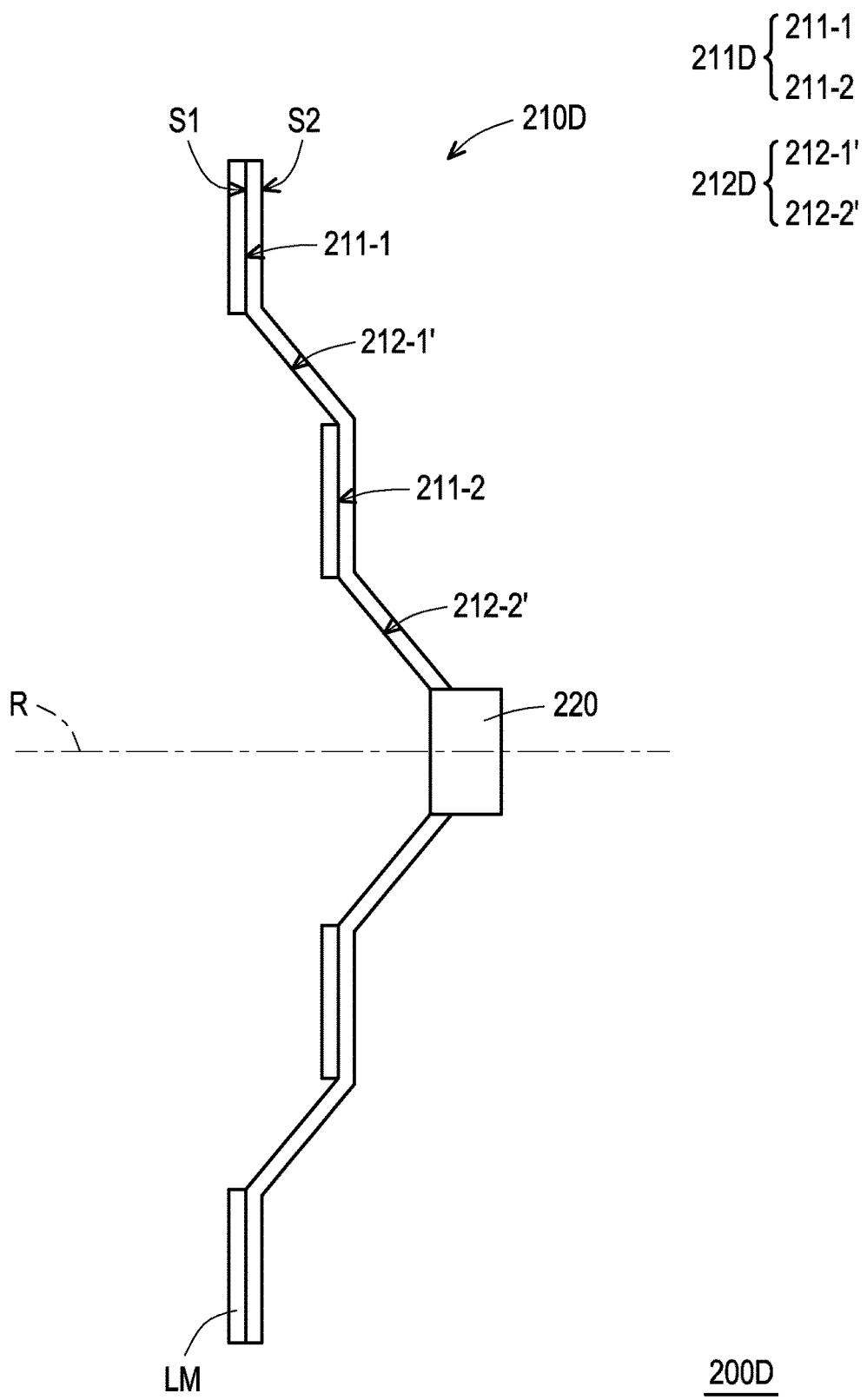
FIG. 5 is a schematic cross-sectional view of a rotation wheel according to a fifth embodiment of the invention.

FIG. 5 is a schematic cross-sectional view of a rotation wheel according to a fifth embodiment of the invention. Referring to FIG. 5, a rotation wheel 200D is similar to the rotation wheel 200 of FIG. 1C, and main differences there between are as follows. In the embodiment, a light adjusting surface 211D of a turnable disc 210D includes a plurality of sub-light adjusting surfaces 211-1 and 211-2, and a connecting surface 212D includes a plurality of sub-connecting surfaces 212-1' and 212-2'. The sub-light adjusting surfaces 211-1 and 211-2 and the sub-connecting surfaces 212-1' and 212-2' may be respectively disposed in a staggered manner and take the motor 220 as a circle center. Moreover, the sub-connecting surfaces 212-1' and 212-2' are both planes, and are neither parallel nor perpendicular to the rotating axis R. In an embodiment of the invention, since the rotation wheel 200D is designed to have the plurality of sub-light adjusting surfaces 211-1, 211-2, the number of light sources 100 of the projection apparatus 10 and the number of the wavelength conversion layers may be correspondingly increased, and a light power of the projection apparatus 10 is increased. Other advantages of the rotation wheel 200D of the embodiment are similar to the advantages of the rotation wheel 200 of FIG. 1C, and details thereof are not repeated.

Figure 6:
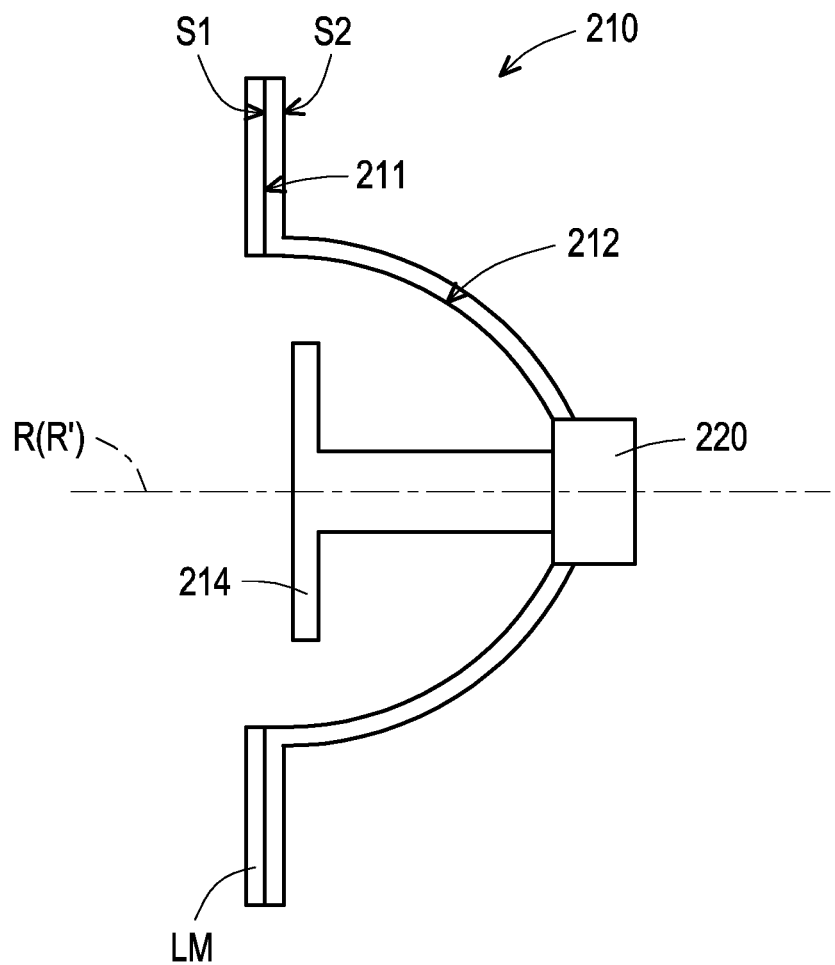
FIG. 6 is a schematic cross-sectional view of a rotation wheel according to a sixth embodiment of the invention.

FIG. 6 is a schematic cross-sectional view of a rotation wheel according to a sixth embodiment of the invention. Referring to FIG. 6, a rotation wheel 200E is similar to the rotation wheel 200 of FIG. 1C, and main differences there between are as follows. In the embodiment, the rotation wheel 200E further includes fan blades 214. The fan blades 214 are provided on the motor 220. The rotating axis R' of the fan blades 214 and the rotating axis R of the motor 220 are preferably coaxial, but the invention is not limited thereto. In an embodiment of the invention, since the rotation wheel 200E is provided with the fan blades 214, and the fan blades 214 and the motor are connected and rotate synchronously, the heat dissipation capacity of the rotation wheel 200 may be greatly improved. Other advantages of the rotation wheel 200E of the embodiment are similar to the advantages of the rotation wheel 200 of FIG. 1C, and details thereof are not repeated.

Figure 7:
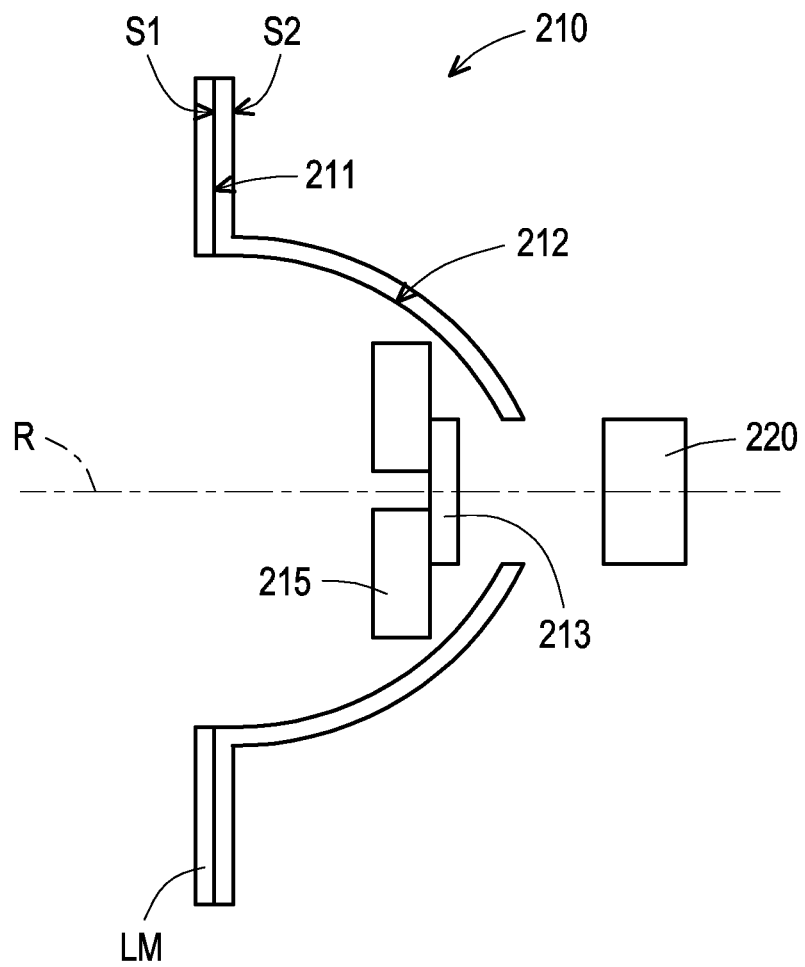
FIG. 7 is a schematic cross-sectional view of a rotation wheel according to a seventh embodiment of the invention.

FIG. 7 is a schematic cross-sectional view of a rotation wheel according to a seventh embodiment of the invention. Referring to FIG. 7, a rotation wheel 200F is similar to the rotation wheel 200 of FIG. 1C, and main differences there between are as follows. In the embodiment, the rotation wheel 200F further includes a blade structure 215 provided on the fixing element 213. The fixing element 213 is used to fix the turnable disc 210 on the motor 220. The blade structure 215 may not only be disposed on the fixing element 213, it may also be disposed on the connecting surface 212. In an embodiment of the invention, since the rotation wheel 200F is provided with the blade structure 215, and the blade structure 215 is rotated along with the operation of the motor 220, airflow disturbance is enhanced to improve the heat dissipation capacity of the rotation wheel 200F. Other advantages of the rotation wheel 200F of the embodiment are similar to the advantages of the rotation wheel 200 of FIG. 1C, and details thereof are not repeated.

Figure 8:
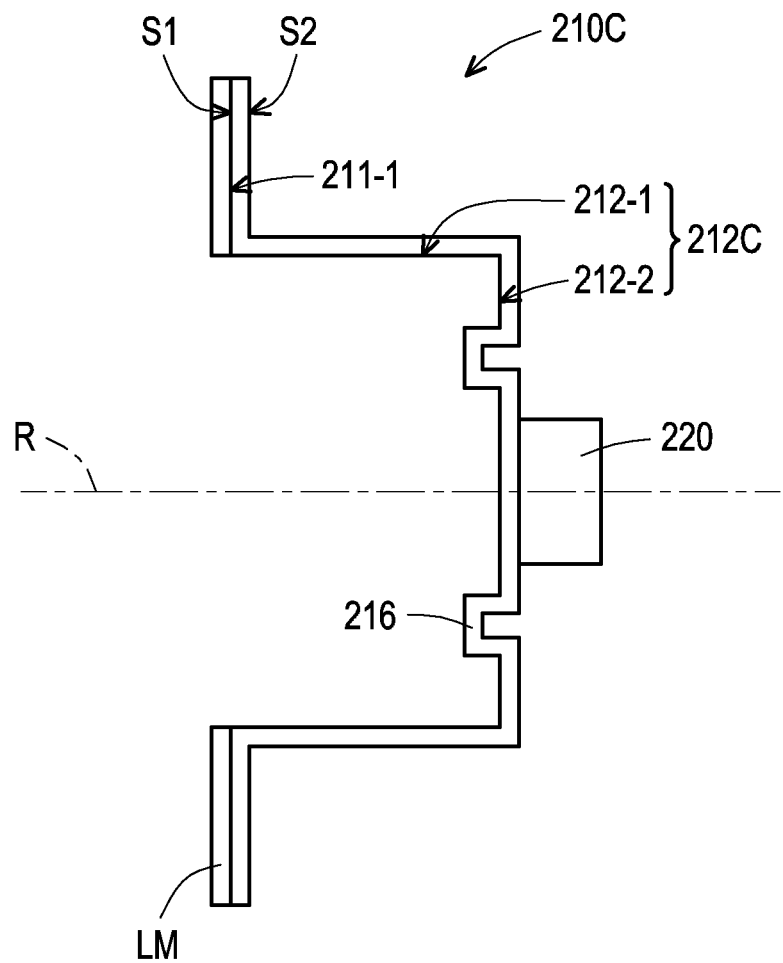
FIG. 8 is a schematic cross-sectional view of a rotation wheel according to an eighth embodiment of the invention.

FIG. 8 is a schematic cross-sectional view of a rotation wheel according to an eighth embodiment of the invention. Referring to FIG. 8, a rotation wheel 200G is similar to the rotation wheel 200C of FIG. 4, and main differences there between are as follows. In the embodiment, the rotation wheel 200G further includes a fixing element (the fixing element 213 shown in FIG. 7, but illustration thereof is omitted in FIG. 8) and a punch structure 216. The fixing element is used to fix the turnable disc 210C on the motor 220. The punch structure 216 is disposed on the connecting surface 212C. In an embodiment of the invention, the punch structure 216 is integrally formed along with the turnable disc 210C. Since the rotation wheel 200G is provided with the punch structure 216, and the punch structure 216 generates airflow disturbance along with the operation of the motor 220, the heat dissipation capacity of the turnable disc 210C is improved. Other advantages of the rotation wheel 200G of the embodiment are similar to the advantages of the rotation wheel 200 of FIG. 1C, and details thereof are not repeated.

In summary, in the rotation wheel and the projection apparatus of an embodiment of the invention, since at least a part of the connecting surface of the rotation wheel is neither parallel nor perpendicular to the rotating axis of the motor, the heat dissipation area of the rotation wheel is increased to increase the energy conversion efficiency of the rotation wheel. Moreover, due to the improved energy conversion efficiency of the rotation wheel, the diameter of the turnable disc relative to the rotating axis may be relatively reduced, thereby further reducing the volume of the rotation wheel or the projection apparatus.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A rotation wheel, comprising a turnable disc and a motor, wherein the turnable disc is connected to the motor and comprises a first surface and a second surface opposite to the first surface, wherein
   the first surface comprises a light adjusting surface and a connecting surface;
   the connecting surface is used to connect the light adjusting surface and the motor;
   the light adjusting surface is perpendicular to a rotating axis of the motor; and
   at least a part of the connecting surface is neither parallel nor perpendicular to the rotating axis,
   wherein the connecting surface is a curved surface and symmetrically surrounds the rotating axis.

2. The rotation wheel as claimed in claim 1, wherein the turnable disc is of equal thickness.

3. The rotation wheel as claimed in claim 1, further comprising fan blades disposed on the motor.

4. The rotation wheel as claimed in claim 1, further comprising a fixing element and a blade structure, wherein the fixing element is used to fix the turnable disc on the motor, and the blade structure is disposed on the fixing element or the connecting surface.

5. A rotation wheel, comprising a turnable disc and a motor, wherein the turnable disc is connected to the motor and comprises a first surface and a second surface opposite to the first surface, wherein the first surface comprises a light adjusting surface and a connecting surface;
the connecting surface is used to connect the light adjusting surface and the motor;
the light adjusting surface is perpendicular to a rotating axis of the motor; and
at least a part of the connecting surface is neither parallel nor perpendicular to the rotating axis,
wherein the connecting surface comprises a plurality of sub-connecting surfaces, and each sub-connecting surface and an adjacent sub-connecting surface thereof are perpendicular to each other.

6. A rotation wheel, comprising a turnable disc and a motor, wherein the turnable disc is connected to the motor and comprises a first surface and a second surface opposite to the first surface, wherein
the first surface comprises a light adjusting surface and a connecting surface;
the connecting surface is used to connect the light adjusting surface and the motor;
the light adjusting surface is perpendicular to a rotating axis of the motor; and
at least a part of the connecting surface is neither parallel nor perpendicular to the rotating axis,
wherein the light adjusting surface comprises a plurality of sub-light adjusting surfaces, and the connecting surface comprises a plurality of sub-connecting surfaces, wherein the plurality of sub-light adjusting surfaces and the plurality of sub-connecting surfaces are disposed in a staggered manner and take the motor as a circle center.

7. A rotation wheel, comprising a turnable disc and a motor, wherein the turnable disc is connected to the motor and comprises a first surface and a second surface opposite to the first surface, wherein
the first surface comprises a light adjusting surface and a connecting surface;
the connecting surface is used to connect the light adjusting surface and the motor;
the light adjusting surface is perpendicular to a rotating axis of the motor; and
at least a part of the connecting surface is neither parallel nor perpendicular to the rotating axis,
wherein rotation wheel further comprising a fixing element and a punch structure, wherein the fixing element is used to fix the turnable disc on the motor, and the punch structure is disposed on the connecting surface.

8. A projection apparatus, comprising an illumination system, a light valve, and a projection lens, wherein the illumination system is used to provide an illumination beam, the light valve is disposed on a transmission path of the illumination beam and used to convert the illumination beam into an image beam, the projection lens is disposed on a transmission path of the image beam and used to project the image beam out of the projection apparatus, and the illumination system comprises a light source and a rotation wheel, wherein
the light source is used to emit an incident beam, wherein the incident beam is converted into the illumination beam by the rotation wheel;
the rotation wheel comprises a turnable disc and a motor, wherein the turnable disc is connected to the motor and comprises a first surface and a second surface opposite to the first surface, wherein
the first surface comprises a light adjusting surface and a connecting surface;
the connecting surface is used to connect the light adjusting surface and the motor;
the light adjusting surface is perpendicular to a rotating axis of the motor; and
at least a part of the connecting surface is neither parallel nor perpendicular to the rotating axis,
wherein the connecting surface is a curved surface and symmetrically surrounds the rotating axis.

9. The projection apparatus as claimed in claim 8, wherein the turnable disc is of equal thickness.

10. The projection apparatus as claimed in claim 8, further comprising fan blades disposed on the motor.

11. The projection apparatus as claimed in claim 8, further comprising a fixing element and a blade structure, wherein the fixing element is used to fix the turnable disc on the motor, and the blade structure is disposed on the fixing element or the connecting surface.

12. A projection apparatus, comprising an illumination system, a light valve, and a projection lens, wherein the illumination system is used to provide an illumination beam, the light valve is disposed on a transmission path of the illumination beam and used to convert the illumination beam into an image beam, the projection lens is disposed on a transmission path of the image beam and used to project the image beam out of the projection apparatus, and the illumination system comprises a light source and a rotation wheel, wherein
the light source is used to emit an incident beam, wherein the incident beam is converted into the illumination beam by the rotation wheel;
the rotation wheel comprises a turnable disc and a motor, wherein the turnable disc is connected to the motor and comprises a first surface and a second surface opposite to the first surface, wherein
the first surface comprises a light adjusting surface and a connecting surface;
the connecting surface is used to connect the light adjusting surface and the motor;
the light adjusting surface is perpendicular to a rotating axis of the motor; and
at least a part of the connecting surface is neither parallel nor perpendicular to the rotating axis,
wherein the connecting surface comprises a plurality of sub-connecting surfaces, and each sub-connecting surface and an adjacent sub-connecting surface thereof are perpendicular to each other.

13. A projection apparatus, comprising an illumination system, a light valve, and a projection lens, wherein the illumination system is used to provide an illumination beam, the light valve is disposed on a transmission path of the illumination beam and used to convert the illumination beam into an image beam, the projection lens is disposed on a transmission path of the image beam and used to project the image beam out of the projection apparatus, and the illumination system comprises a light source and a rotation wheel, wherein
the light source is used to emit an incident beam, wherein the incident beam is converted into the illumination beam by the rotation wheel;
the rotation wheel comprises a turnable disc and a motor, wherein the turnable disc is connected to the motor and comprises a first surface and a second surface opposite to the first surface, wherein the first surface comprises a light adjusting surface and a connecting surface;
the connecting surface is used to connect the light adjusting surface and the motor;

the light adjusting surface is perpendicular to a rotating axis of the motor; and at least a part of the connecting surface is neither parallel nor perpendicular to the rotating axis, wherein the light adjusting surface comprises a plurality of sub-light adjusting surfaces, and the connecting surface comprises a plurality of sub-connecting surfaces, wherein the plurality of sub-light adjusting surfaces and the plurality of sub-connecting surfaces are disposed in a staggered manner and take the motor as a circle center.

14. A projection apparatus, comprising an illumination system, a light valve, and a projection lens, wherein the illumination system is used to provide an illumination beam, the light valve is disposed on a transmission path of the illumination beam and used to convert the illumination beam into an image beam, the projection lens is disposed on a transmission path of the image beam and used to project the image beam out of the projection apparatus, and the illumination system comprises a light source and a rotation wheel, wherein the light source is used to emit an incident beam, wherein the incident beam is converted into the illumination beam by the rotation wheel;

the rotation wheel comprises a turnable disc and a motor, wherein the turnable disc is connected to the motor and comprises a first surface and a second surface opposite to the first surface, wherein the first surface comprises a light adjusting surface and a connecting surface;

the connecting surface is used to connect the light adjusting surface and the motor;

the light adjusting surface is perpendicular to a rotating axis of the motor; and at least a part of the connecting surface is neither parallel nor perpendicular to the rotating axis, wherein the rotation wheel further comprising a fixing element and a punch structure, wherein the fixing element is used to fix the turnable disc on the motor, and the punch structure is disposed on the connecting surface.

* * * * *